(12) United States Patent  
Albrecht

(10) Patent No.: US 7,020,895 B2  
(45) Date of Patent: Mar. 28, 2006

(54) REMOTE COMPUTER VIRUS SCANNING

(75) Inventor: Mikael Albrecht, Espoo (FI)

(73) Assignee: F-Secure Oyj, Espoo (FI)

( * ) Notice: Subject to any disclaimer, the term of this patent is extended or adjusted under 35 U.S.C. 154(b) by 893 days.

(21) Appl. No.: 09/741,084

(22) Filed: Dec. 21, 2000

(65) Prior Publication Data

US 2001/0005889 A1    Jun. 28, 2001

(30) Foreign Application Priority Data

Dec. 24, 1999   (GB)  .................................  9930613

(51) Int. Cl.
*G06F 12/16*    (2006.01)

(52) U.S. Cl. .......................................... 726/22; 726/24

(58) Field of Classification Search ........ 713/200–201, 713/188; 714/38; 709/200, 221–224, 217; 726/22–25

See application file for complete search history.

(56) References Cited

U.S. PATENT DOCUMENTS

| | | | |
|---|---|---|---|
| 5,623,600 A | | 4/1997 | Ji et al. |
| 5,649,095 A | * | 7/1997 | Cozza .......................... 714/39 |
| 5,832,208 A | | 11/1998 | Chen et al. |
| 5,960,170 A | | 9/1999 | Chen et al. |
| 6,029,256 A | * | 2/2000 | Kouznetsov .................. 714/38 |
| 6,035,423 A | * | 3/2000 | Hodges et al. ................. 714/38 |
| 6,067,410 A | * | 5/2000 | Nachenberg ................... 703/28 |
| 6,269,456 B1 | * | 7/2001 | Hodges et al. ................. 714/38 |
| 6,347,375 B1 | * | 2/2002 | Reinert et al. .............. 713/200 |
| 6,516,337 B1 | * | 2/2003 | Tripp et al. .................. 709/202 |
| 6,535,891 B1 | * | 3/2003 | Fisher et al. ................. 707/203 |
| 6,721,847 B1 | * | 4/2004 | Hursey ........................ 711/118 |

FOREIGN PATENT DOCUMENTS

GB          2 283 341 A          5/1999

OTHER PUBLICATIONS

C. Nachenberg, "Computer Virus-Coevolution", Communications of the Association for Computing Machinery, New York, US, vol. 40, No. 1, 1997, pp 46-51, XP0006898960.

* cited by examiner

*Primary Examiner*—Hosuk Song  
(74) *Attorney, Agent, or Firm*—Squire, Sanders & Dempsey LLP

(57)   ABSTRACT

A method of scanning electronic files for computer viruses comprises identifying at a first node 4 of a computer network 1, electronic files which require to be scanned for computer viruses. The first node 4 initiates a dialogue with a second node 7 of the network 1, the second node comprising a virus scanning application. During the dialogue, the second node 7 identifies to the first node 4 one or more portions of the electronic file required by the virus scanning application. The first node 4 transfers the identified portions to the second node 7 which then carries out a virus scanning operation. The result of this operation is then returned to the first node 4.

14 Claims, 3 Drawing Sheets

REMOTE COMPUTER VIRUS SCANNING

FIELD OF THE INVENTION

The present invention relates to remote computer virus scanning and in particular to virus scanning in a system where data to be scanned is transferred from an agent to a scanning engine located on a central server. The invention is applicable in particular, although not necessarily, to a system in which the agent and the server exist at different locations.

BACKGROUND TO THE INVENTION

Computer viruses are a well recognised problem in the computer and software industry and amongst computer users in general. Whilst early approaches to virus detection relied upon providing an anti-virus software application, capable of detecting previously identified viruses or suspect files, in each individual computer, the recent growth in network computing has led to the introduction of gateway based solutions. This approach involves supplementing, or in some cases replacing, the anti-virus applications running on individual computers connected to a network with anti-virus applications running on the gateway (or gateways) which connects the network to the outside world. Such a gateway based anti-virus application is typically provided at a firewall, although it may also be provided at an Internet server, mail server, etc. An anti-virus application may also be provided at a database server of the network to screen data transfers to and from a central storage location.

One network approach embodied in the F-Secure Anti-Virus Agent and Server™ product (Data Fellows Oyj, Espoo, Finland) offers an improved solution in which "agents" are located at various transit nodes of a network and identify data which is capable of containing a computer virus (by for example examining file name extensions). The intercepted suspect data is then transferred by the agent, over the network, to a central server comprising an anti-virus scanning application which performs a virus scan on the data. The result of the virus scan is returned from the central server to the agent which initiated the scan. The advantage of this approach as compared to conventional gateway scanning is that it is only necessary to provide one or a small number of scanning applications in a network. This reduces the maintenance overheads for the anti-virus application (e.g. by reducing the number of virus updates required) and also reduces the processing overheads at the machines where the agents are located. It follows that the anti-virus application is more likely to be kept up to date, and hence the security of the network is improved. A further advantage of the agent and server solution is that the scanning engine can be designed to run on one or only a small number of platforms, whilst the agent may be designed to run on a larger number of platforms—it is relatively easy to "port" the agent to different platforms as compared to the scanning engine.

A disadvantage of the approach described in the preceding paragraph is that it may require the transfer of relatively large volumes of data over a computer network. This can slow down the virus scanning operation and may also result in network traffic congestion, having a knock-on effect on non-virus scanning related traffic. The transfer of unsecure information over a network may also introduce security risks.

SUMMARY OF THE PRESENT INVENTION

The inventor of the present invention has realised that in many cases, although large volumes of data may be transferred between an agent and a central virus scanning server, the scanning application actually only looks at or examines a relatively small proportion of this data. For example, the scanning application may in some cases be able to tell that a document is not infected with a virus merely by looking at the template-bit in the header of a Microsoft Word™ document.

It is an object of the present invention to overcome or at least mitigate the above noted disadvantages. In particular, it is an object of the present invention to reduce the volume of data which must be transferred between an agent and a server for the purpose of virus scanning.

These and other objects are achieved at least in part by transferring from an agent to a virus scanning server substantially only those portions of a file which are actually required by the scanning engine.

According to a first aspect of the present invention there is provided a method of scanning electronic files for computer viruses, the method comprising:

identifying at a first node of a computer network, electronic files which require to be scanned for computer viruses;

initiating a dialogue between said first node and a second node of the network, the second node comprising a virus scanning application, during which dialogue the second node identifies to the first node one or more portions of the electronic file required by the virus scanning application; and transferring the identified portion(s) from the first node to the second node over the network.

Embodiments of the present invention do not necessarily require the transfer of entire electronic files from the agent to the server. Rather, the embodiments only require those parts which are of direct interest to the scanning application to be transferred. For example, the scanning application may require the transfer of only a header portion of an electronic file or of a block of data pointed to by a jump instruction located in the header. In addition to reducing the volume of network traffic, embodiments of the present invention increase network security by avoiding the need to transfer entire files on a possibly insecure network.

Preferably, the method of the present invention involves identifying electronic files which require virus scanning, at a plurality of first nodes of the computer network. A dialogue is then initiated between the first nodes and the said second node when appropriate. That is to say that a set of first nodes may be served by a single scanning application existing at a second node.

It will be appreciated that the first node(s) and the second node may be located at respective different locations in the computer network. These nodes may be personal computers workstations, etc.

The first node may be, for example, one of a database server, electronic mail server, an Internet server, a proxy server, or a firewall server.

The first and second nodes preferably conduct said dialogue using a network protocol such as CVP or FNP (Data Fellows Oyj, Espoo, Finland), although the protocol may require some modification. The network protocol typically is carried by a transport protocol such as IP, IPX, or Net BEUI.

Preferably, the method comprises analysing the file portions received at the second node for each file to be scanned, to determine whether or not the file contains a virus or cannot be guaranteed to not contain a virus. More preferably, the result of this analysis is sent to the first node over the network.

In the event that a file is identified as containing a virus, the second node may initiate a dialogue with the first node and transfer to the first node data portions to be written into the file to disinfect the file (this process may also require the transfer of additional file portions from the first to the second node for modification at the second node). The first node may then write the data portions into the file, erasing other portions if necessary. Alternatively, the second node may send instructions to the first node to inform the first node how to disinfect the file.

According to a second aspect of the present invention there is provided an anti-virus scanning system for use in scanning electronic files in a computer network, the system comprising:

a first computer having processing means arranged to identify electronic files which should be scanned for computer viruses; and a second computer having processing means arranged to perform a virus scanning operation, the first computer further comprising communication means for initiating a dialogue between the first computer and the second computer, during which the second computer identifies to the first computer those portions of the electronic files required by the first computer for performing the virus scanning operation, and for transferring those portions to the second computer.

According to a third aspect of the present invention there is provided a computer memory encoded with executable instructions representing a computer program for causing a first computer connected to a computer network to:

identify electronic files which require to be scanned for computer viruses;

initiate a dialogue between the first computer and a second computer also connected to the computer network;

receive from the second computer an identification of portions of the electronic file which are required for virus scanning of the electronic files at the second computer; and transfer the identified portion from the first computer to the second computer.

According to a fourth aspect of the present invention there is provided a computer memory encoded with executable instructions representing a computer program for causing a first computer connected to a computer network to:

receive a dialogue initiation request from a second computer also connected to the computer network concerning an electronic file identified by the second computer as requiring a virus scan;

identify to the second computer those portions of the electronic file which are required by the first mentioned computer for performing a virus scanning operation at the first computer; and receive the identified portions of the electronic file from the first node.

According to a fifth aspect of the present invention there is provided a method of disinfecting an electronic file stored at a first node of a computer network, after the file has been identified as containing a virus by a virus scanning engine located at a second network node, the method comprising:

sending from the second node to the first node, data portions to be written into the infected file and/or instructions for disinfecting the file; and receiving the data portions and/or instructions at the first node and writing the data portions into the infected file and/or carrying out said instructions.

Preferably, said first and second nodes are respective computer workstations coupled to a common network. The workstation corresponding to the second node may be arranged to communicate with a plurality of workstations corresponding to respective second nodes.

DETAILED DESCRIPTION OF A PREFERRED EMBODIMENT

Figure 1:
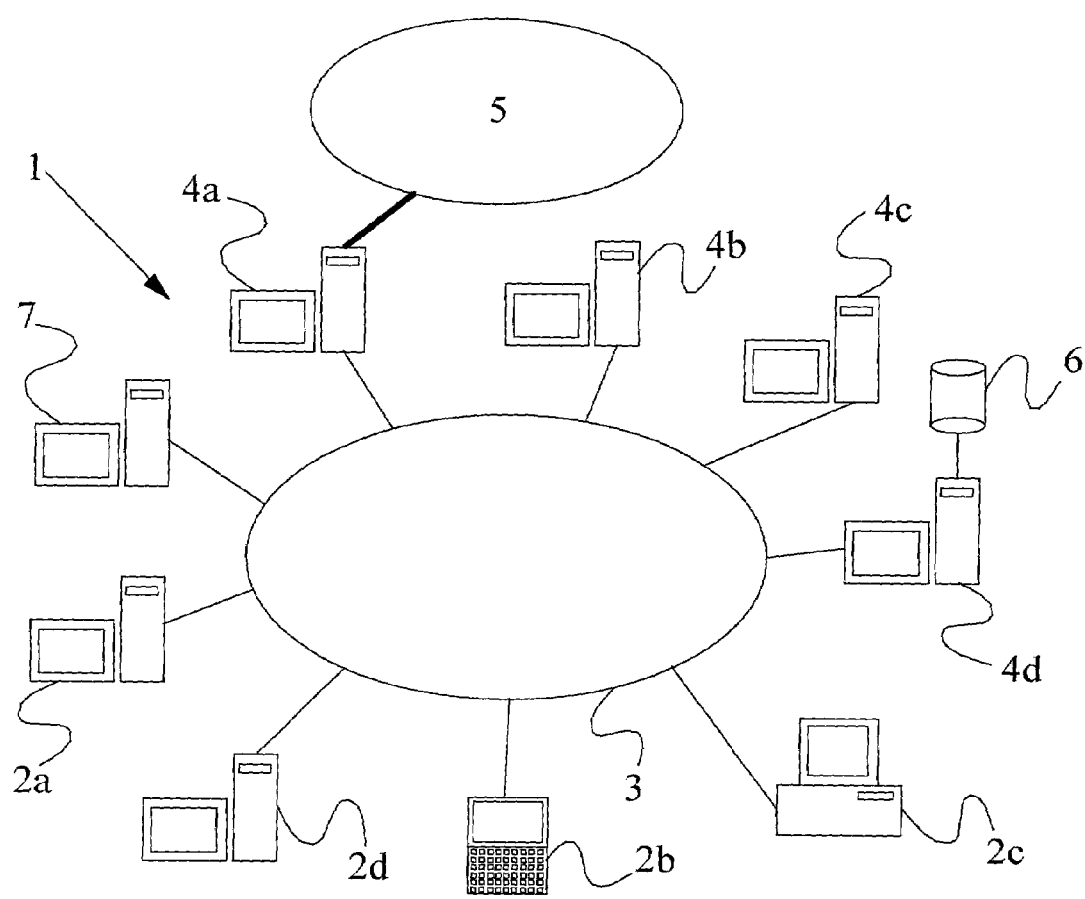
FIG. 1 shows schematically a data network having a central virus scanning server.

A computer data network (illustrated generally by reference numeral 1) is shown in FIG. 1 and comprises a number of users or clients 2. These users include an administrator's workstation 2a, one or more notebook computers 2b, a number of computer workstations 2c, and a server 2d. The network comprises a physical wire network (Local Area Network (LAN)) 3 to which each of the users 2 is connected via respective network cards (generally integrated into the user terminals and therefore not shown separately in FIG. 1). The network may be an Ethernet network, X.25 network, or the like, with TCP/IP protocol being used as the transport protocol (alternative transport protocols include IPX, Net BEUI, etc). Although it is not considered here in detail, the wire network 3 of FIG. 1 may be replaced by a wireless LAN, e.g. using radio signals to transmit data.

Also connected to the network (via respective network cards) are a number of so-called "protected systems" 4. These include a firewall 4a, a mail server 4b, a proxy server 4c, and a database server 4d. As will be known to the skilled person, the firewall 4a provides a secure gateway between the network 1 and the "outside world", in this case the Internet 5. All data traffic coming from the Internet 5 to the network 1 passes through the firewall 4a where its access authority is checked. The firewall 4a may also control the access of users 2 to the Internet 5. The mail server 4b and the proxy server 4c provide transit nodes for electronic mail and www traffic respectively. Data is routed between the mail server 4b, the proxy server 4c, and the Internet 5, via the firewall 4a. The mail server 4b may also act as a router for internal network electronic mail. The protected systems 4 also include a database server 4d which acts as a gateway or transit node between the network and a central data storage facility 6. This facility is a repository for data shared by the network users 2.

An additional server 7 provides virus scanning functionality as will be described below. This virus scanning server 7 is coupled to the network 1 and in use communicates with the protected systems 4 and the administrator's workstation 2a. The server 7 is able to communicate with the protected systems and workstation 2a using for example standardised or proprietary protocols carried over the TCP/IP LAN 3.

Each of the protected systems 4 has stored in its memory a so-called "agent" application which is run by the systems in the background to the normal tasks performed by the systems. The function of an agent is to intercept data (in the form of files) which is being transferred through the system 4 on which the agent is running. An intercepted file is scanned on-the-fly by the agent to determine whether or not the file has a form which may contain a virus. Thus, the agent may identify files having a .doc, .exe, etc., filename extension, files corresponding to e-mails, e-mail attachment, or documents containing macros. It will be appreciated that new viruses are being continually created and that this list is not exhaustive.

Considering for example the firewall 4a, this firewall will intercept files being transferred from the Internet 5 to the network 3 and possibly files travelling in the reverse direction. Similarly, the mail server 4b and proxy server 4c will intercept e-mails and www files respectively, whilst the database server 4d scans files being transferred to and from the data storage facility 6. The network may be arranged such that the unnecessary duplication of tasks is avoided, e.g. the mail server 4b does not scan files received from the firewall 4a but only scans internally transferred mail.

Files which are not of a suspect type are "passed" by the agent and are routed by the system to an appropriate destination (e.g. a user 2). However, if an agent identifies a suspect file, then the agent initiates a dialogue with the virus scanning server 7 using a suitable network protocol. Currently, network protocols such as CVP and FNP are used to perform network dialogues and such protocols may be modified in order to implement the present method.

Figure 2:
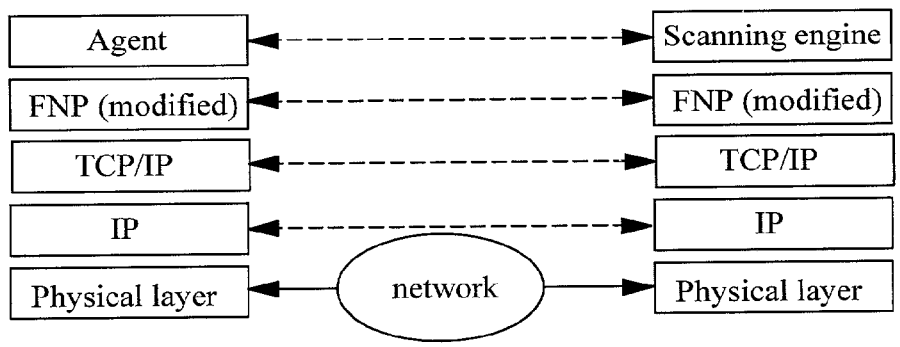
FIG. 2 illustrates communication protocols used between the virus scanning server of FIG. 1 and an agent located at a node of the network.

FIG. 2 illustrates schematically the server and agent arrangement and in particular the communication protocols which allow the server and agent to communicate. At the agent, the agent application sits on top of the modified FNP network protocol entity. Beneath the FNP entity are TCP/IP and IP entities, whilst the lowermost entity is the physical layer which provides the physical connection to the network. A similar stack exists at the scanning engine, with the agent application being replaced by the scanning engine application. The dashed lines in FIG. 2 illustrate the peer entity communications whilst the solid line coupling the physical entities illustrates the actual data transfer path.

Figure 3:
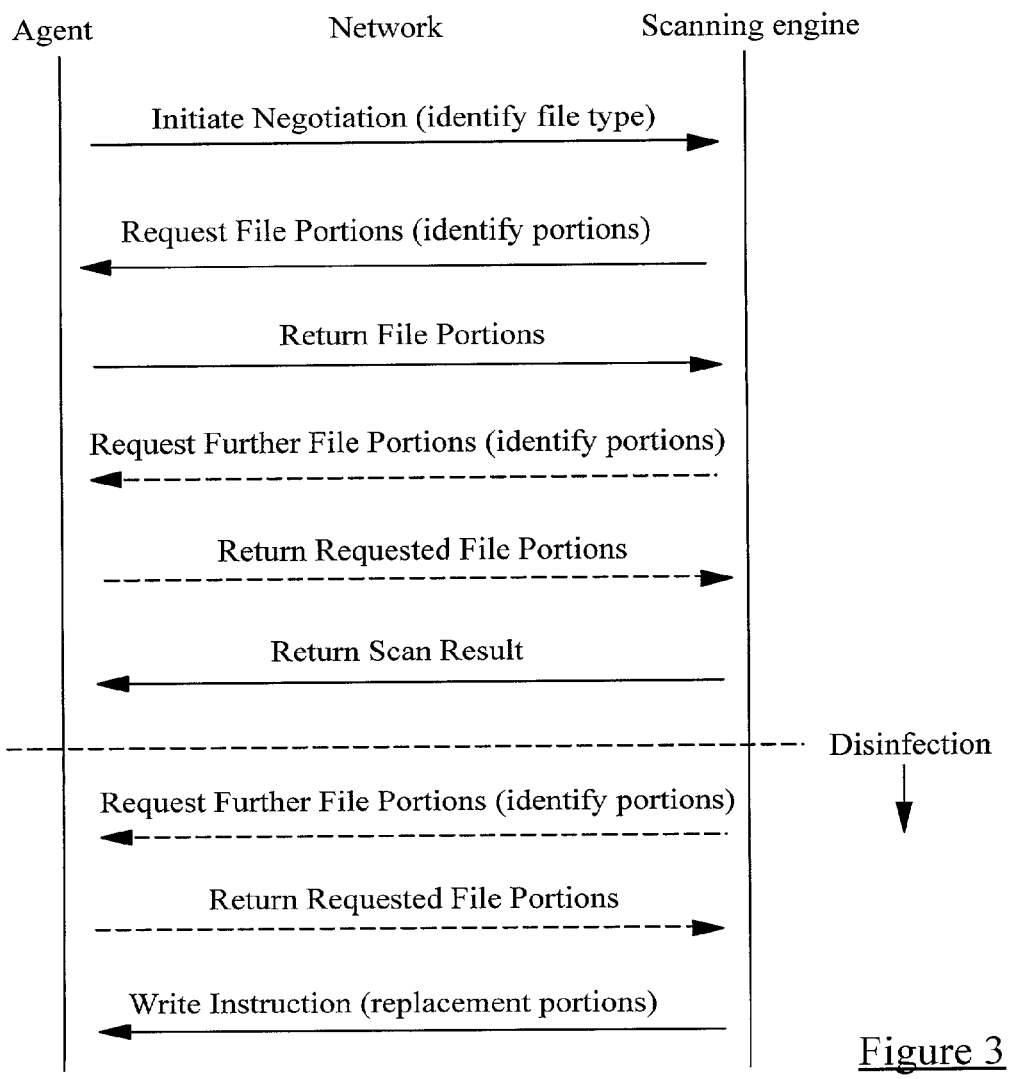
FIG. 3 illustrates data traffic between and agent and a virus scanning server in the network of FIG. 1.

FIG. 3 illustrates the data exchange process which takes place at the application level, between the agent application and the scanning engine application, following the identification at the agent of a file which requires virus scanning. The agent initiates the FNP dialogue by sending an Initiate Negotiation request to the scanning engine. This request may include, for example, an identification of the type of file to be scanned. Using the received information, the scanning engine determines which portions of the identified file it requires in order to perform the virus scan. For example, the scanning engine may determine that it requires only the template bits at the top of a Word™ file. The required portions are identified in a Request File Portions message which is sent to the agent.

The agent returns the requested portions to the scanning engine in a Return File Portions message (or several such messages), whereupon the scanning engine commences the virus scanning operation. This may include, for example, generating "signatures" for the received file portions and comparing these against signatures produced from known viruses. In certain cases, the scanning engine may determine that it requires further file portions from the agent. Upon completion of the scan, the scanning engine returns the result to the agent in a Return Scan Result message. In the event that no virus has been identified in the file, the agent allows the file transfer (or other operation involving the scanned file) to proceed.

In the event that a virus has been identified in the scanned file, one of several courses of action may be taken. Firstly, and as is illustrated beneath the dashed line in FIG. 3, a disinfection procedure may be carried out. This involves the scanning engine generating replacement file portions (on the basis the data previously transferred to the scanning engine from the agent, or using additionally transferred file portions), and returning these to the agent in a Write Instruction. The agent acts upon the Write Instruction by rewriting portions of the file to remove the virus infection. If no disinfection procedure is available, the file transfer procedure is suspended and the network administrator alerted, e.g. by sending a message over the network 1 from the agent to the network administrator's workstation.

Figure 4:
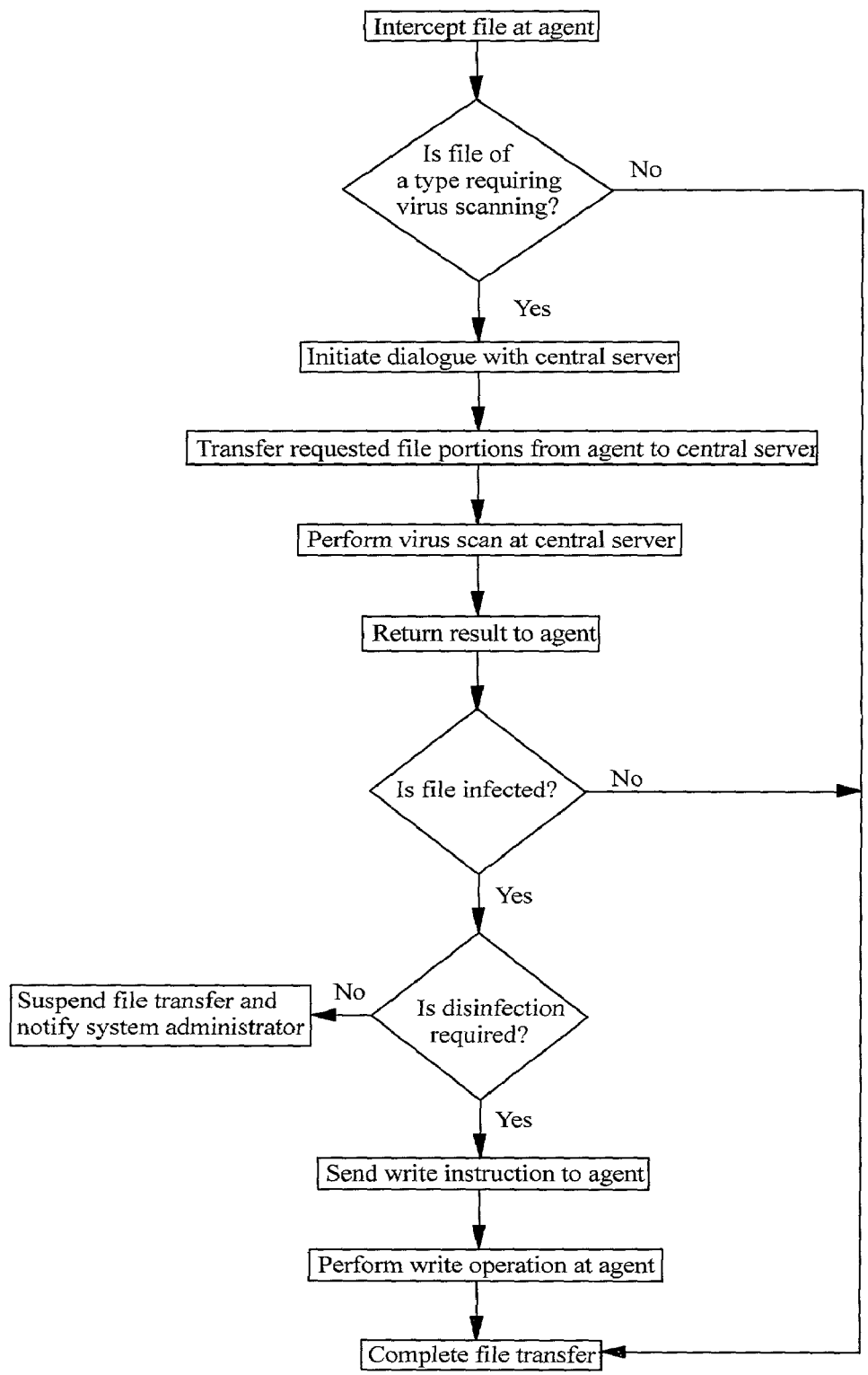
FIG. 4 is a flow diagram illustrating a virus scanning operation of the network of FIG. 1.

FIG. 4 is a flow diagram illustrating the method described above.

It will be appreciated by the person of skill in the art that various modifications may be made to the above described embodiment without departing from the scope of the present invention. For example, whilst the above embodiment placed agents only at the firewall 4a, mail server 4b, proxy server 4c, and database server 4d, agents may also be present at one or more of the client computers 2.

What is claimed is:

1. A method of scanning electronic files for computer viruses, the method comprising:

identifying at a first node of a computer network, electronic files which require to be scanned for computer viruses;

initiating a dialogue between said first node and a second node of the network, the second node comprising a virus scanning application, during which dialogue the second node identifies to the first node one or more portions of the electronic file required by the virus scanning application;

transferring the identified portion(s) from the first node to the second node over the network;

at the second node, scanning the transferred portions for computer viruses; and if the second node determines that the electronic file includes a computer virus and determines that the electronic file is able to be disinfected, informing the first node by the second node of the determinations.

2. A method according to claim 1 and comprising identifying electronic files which require virus scanning, at a plurality of first nodes of the computer network and initiating a dialogue between the first nodes and the said second node when appropriate.

3. A method according to claim 1, wherein the first node and the second node are located at respective different locations in the computer network.

4. A method according to claim 1, wherein the first node is one of a database server, electronic mail server, an Internet server, a proxy server, or a firewall server.

5. A method according to claim 1, wherein the dialogue is carried out using a network protocol carried by IP.

6. A method according to claim 1 and comprising analysing the file portions received at the second node to determine whether or not the file contains the virus or cannot be guaranteed to not contain the virus, and returning the result to the first node over the network.

7. A method according to claim 6 and comprising transferring from the second node to the first node data portions to be written into the file to disinfect the file.

8. A method according to claim 6 and comprising sending instructions from the second node to the first node to inform the first node how to disinfect the file.

9. An anti-virus scanning system for use in scanning electronic files in a computer network, the system comprising:
a first computer having processing means arranged to identify electronic files which should be scanned for computer viruses; and
a second computer having processing means arranged to perform a virus scanning operation,
the first computer further comprising communication means for initiating a dialogue between the first computer and the second computer, during which the second computer identifies to the first computer those portions of the electronic files required by the first computer for performing the virus scanning operation, and for transferring those portions to the second computer, and
the second computer further comprising determination means for scanning the transferred portions for computer viruses, and, when the second computer determines that the electronic files include a computer virus and determines that the electronic files are able to be disinfected, informing the first computer of the determinations.

10. A computer memory encoded with executable instructions representing a computer program for causing a first computer connected to a computer network to:
identify an electronic file which is required to be scanned for computer viruses;
initiate a dialogue between the first computer and a second computer also connected to the computer network;
receive from the second computer an identification of portions of the electronic file which are required for virus scanning of the electronic file at the second computer;
transfer the identified portions from the first computer to the second computer;
scan the transferred portions for computer viruses at the second computer; and
if the second computer determines that the electronic file includes a computer virus and determines that the electronic file is able to be disinfected,
inform the first computer by the second computer of the determinations.

11. A computer memory encoded with executable instructions representing a computer program for causing a first computer connected to a computer network to:
receive a dialogue initiation request from a second computer also connected to the computer network concerning an electronic file identified by the second computer as requiring a virus scan;
identify to the second computer those portions of the electronic file which are required by the first mentioned computer for performing a virus scanning operation at the first computer;
receive the identified portions of the electronic file from the second computer; and
inform the second computer of an outcome if the first computer determines that the electronic file includes a computer virus and determines that the electronic file is able to be disinfected.

12. A method of disinfecting an electronic file stored at a first node of a computer network, after the file has been identified as containing a virus by a virus scanning engine located at a second network node, wherein the first node and the second node initiate a dialogue, the method comprising:
informing the first node by the second node that a virus has been identified and is able to be disinfected;
sending from the second node to the first node, data portions to be written into the infected file or instructions for disinfecting the file; and
receiving the data portions or instructions at the first node and writing the data portions into the infected file or carrying out said instructions.

13. A method according to claim 12, wherein said first and second nodes are respective computer workstations coupled to a common network.

14. A method according to claim 13, wherein the workstation corresponding to the second node is arranged to communicate with a plurality of workstations corresponding to respective first nodes.

* * * * *